Dec. 19, 1961   G. A. LYON   3,013,639
AIR CIRCULATION WHEEL STRUCTURE
Filed Oct. 17, 1958
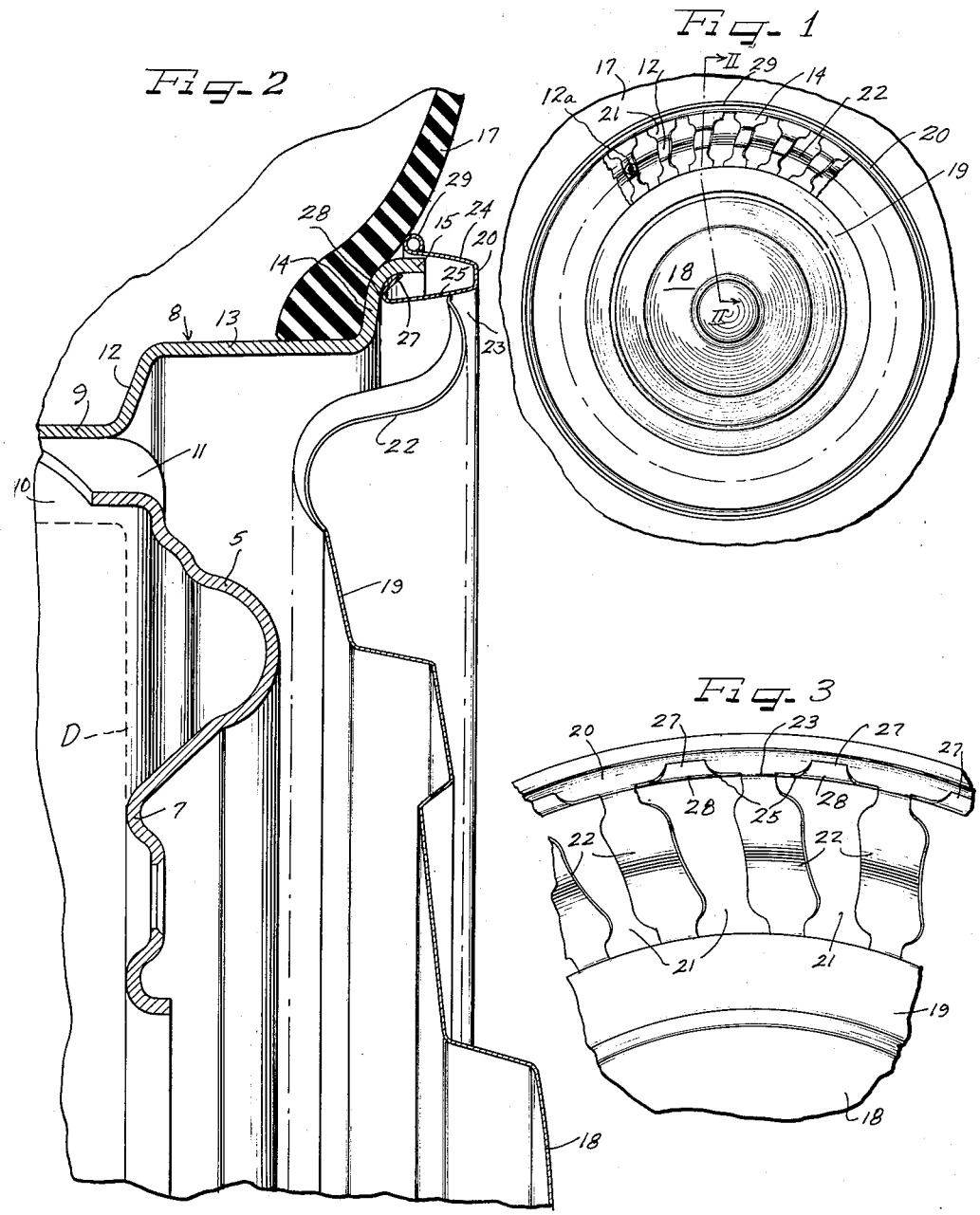
Inventor
George Albert Lyon 3,013,639

AIR CIRCULATION WHEEL STRUCTURE

George Albert Lyon, Detroit, Mich., assignor to Lyon Incorporated, Detroit, Mich., a corporation of Delaware Filed Oct. 17, 1958, Ser. No. 767,823
5 Claims. (Cl. 188—264)

This invention relates to improvements in wheel structures and more particularly concerns the ornamental and protective covering of the outer sides of vehicle wheels in a manner to promote circulation of air through the wheel and the cover.

Due to the current mode in automobiles of small wheels and large balloon tires, a substantial problem is created with respect to overheating of the brakes, this problem being accentuated by the substantial weight and high speeds of operation of the vehicles.

An important object of the present invention is to provide an improved wheel structure wherein an ornamental and protective cover over the outer side of the wheel enhances circulation of air through the wheel for cooling of the brake drum.

Another object of the invention is to provide in a wheel structure an improved, economy type wheel cover having air circulation promoting means and novel means for retaining the cover on the outer side of the wheel.

A further object of the invention is to provide in a wheel structure an improved cover for disposition over the outer side thereof includfing novel means for self-retention of the cover on the wheel by engagement with the terminal flange of the tire rim.

Still another object of the invention is to provide an improved wheel structure affording efficiently disposed means for promoting air circulation through the wheel and with cover retaining fingers struck from the cover and engageable with the terminal flange of the tire rim, with stabilizer means associated with the retaining fingers.

A still further object of the invention is to provide an improved air circulation promoting wheel cover for disposition over the outer side of a vehicle wheel.

Other objects, features and advantages of the present invention will be readily apparent from the following detailed description of a preferred embodiment thereof taken in conjunction with the accompanying drawing, in which:

FIGURE 1 is an outer side elevational view of a wheel structure embodying features of the invention;

FIGURE 2 is an enlarged fragmentary radial sectional detail view taken substantially on the line II—II of FIGURE 1; and FIGURE 3 is a fragmentary inner side elevational view of the cover.

A vehicle wheel to which the present invention is applicable includes a wheel body 5 of the disk spider type having a central bolt-on flange 7 adapted to be secured in the usual manner to an axle structure including a brake drum D housed generally within the hollow of the inner side of the wheel including the wheel body 5 and a tire rim 8 including a base flange 9 secured in suitable fashion such as by welding or riveting to a generally axially inwardly extending attachment flange 10 of the wheel body provided at suitable intervals such as four equally spaced peripherally with inset air circulation openings 11 by which air circulating through the wheel is adapted to afford a cooling effect for the brake drum D. At the outer side of the base flange 9 of the tire rim, a side flange 12 carries a valve stem 12*a* and merges with an intermediate generally axially outwardly extending flange 13, in turn merging with a generally radially outwardly extending portion 14 of a terminal flange which includes a generally axially outwardly extending lip portion 15. A pneumatic tire 17 of the tubeless type is adapted to be carried by the muflti-flange, drop center tire rim.

As shown, the cover is of the full disk type made from one piece of sheet material such as stainless steel, brass, or other suitable metallic sheet or strip and dimensioned to cover not only the wheel body 5 but also the tire rim 8. If preferred, the cover may be a two-piece structure including a central separable hub cap and an outer trim cover member having an inner diameter which is coactive with the hub cap portion of the cover assembly to, in effect, afford a full cover over the outer side of the wheel.

In the cover shown, a central crown portion 18 is dimensioned to overlie the wheel body 5 and more particularly the bolt-on flange 7 thereof. About the crown portion 18 is an intermediate portion 19 adapted to overlie the adjacent portions of the wheel body 5 and the tire rim 8 and having thereabout a circular radially outer marginal portion 20 for overlying the terminal flange and more particularly the flange portion 15 thereof. It will be observed that the intermediate portion 19 is generally dished axially inwardly to extend into the large annular groove afforded between the axially outwardly bulging portion of the wheel body and the tire rim.

Although the cover is disposed over the entire outer side of the wheel, effective circulation of air through the wheel is promoted by the provision of a circumferentially spaced series of generally radially extending openings or slots 21 in the radially outer portion of the dished portion 19 of the cover alternating with vane louver spoke elements 22 of preferably sinuous longitudinal or radial shape as well as transverse or circumferential shape. In the present instance the spoke louvers 22 are of the twisted louver form derived by torsionally relatively offsetting the radially inner and outer generally rigid portions of the cover to which the opposite ends of the spoke louvers are connected, whereby uniformly to tilt one side of the louvers in one axial direction and the opposite side in the opposite axial direction, as preferred and to afford the generally louver shape shown. In the radial direction, the spokes are of generally ogee curvature extending from the radially inner portion of the indented portion 19 of the cover generally radailly and axially outwardly to the outer marginal portion 20 of the cover.

It will be observed that the openings 21 are disposed generally opposite the wheel openings 11, and the spoke louvers and the openings extend into overlying relation to the radially extending terminal flange portion 14. This relationship affords especially effective air circulation in the service running of the wheel. Where the axially outwardly directed side edges of the spoke louvers 22 are disposed in the circumferential direction of rotation of the wheel, air is generally scooped axially inwardly toward the wheel openings 11. Where the axially outwardly directed side edges of the louver spokes are on the trailing sides of the spoke louvers in the rotation of the wheel, there will be an aspirating effect tending to draw air through the openings 11 of the wheel. In either event, cooling circulation of air past the brake drum is effected.

According to the present invention, the outer marginal portion 20 of the cover affords numerous advantages and serves several functions including the provision of means for retaining the cover on the wheel and supporting the cover in relation to the wheel, stabilizing the retaining means, protecting the spoke louvers 22, and generally simulating attractively the lip portion of the tire rim terminal flange structure. To this end, the marginal portion 20 is in the form of an annular generally axially outwardly projecting rib of substantially U-shape opening axially inwardly toward and concealingly overlying the terminal lip flange 15 in assembly. At its radially inner side, the marginal rib 20 has extending angularly from its crown portion a generally axially inwardly extending continuous annular wall 23 to the axially inner edge of which the resilient spoke louvers 22 are integrally connected. At its radially outer side, the marginal rib 20 has extending angularly from its crown portion a generally axially inwardly extending flange wall 24. As will be best seen in FIGURE 2, the rib walls 23 and 24 are disposed in spaced confronting relation and are joined to the crown of the rib 20 angularly in a manner which imparts rigidity to the rib.

For cover retaining and supporting purposes, the marginal cover rib 20 carries a circumferentially spaced series of cover retaining resilient fingers 25 conveniently derived from material struck from the intermediate cover portion 19 adjacent to the rib margin 20 in providing the air opening and circulation slots 21 between the circulation promoting louver spokes 22. Each of the retaining fingers 25 comprises a generally axially extending leg of a maximum width preferably greater than its length and generally following the curvature of the radially inner rib wall 23 in circumferential direction and with the axial leg extending as a continuation of the inner wall flange 23 substantially axially inwardly beyond the adjacent junctures of the louver spokes 22 with the wall flange 23. In the present instance, the width of the axial legs of the retaining fingers 25 is substantially greater than the space between adjacent fingers, thus affording a large number of the retaining fingers circumferentially about the cover.

The retaining fingers 25 are somewhat longer than the length of the terminal lip flange 15 and the axial legs of the retaining fingers are on a diameter smaller than the inside diameter of the lip flange 15 but larger than the inner diameter to which the axially facing terminal flange portion 14 extends at juncture with the intermediate flange 13. Through this arrangement, generally radially and axially outwardly angled retaining terminals 27 on the respective retaining fingers 25 are adapted to project in the space between the axial legs of the retaining fingers and the inner face of the terminal flange lip 15 to engage in gripping retaining relation against the inner face of the lip flange, while respective juncture shoulders 28 of the terminals with the axial finger legs are engageable in bottomed relation against the terminal flange portion 14 for determining the axially inward disposition of the cover on the wheel. Herein, the finger terminals 27 are short and stiff and although tapering to a narrower width than the axial legs of the retaining fingers affording firm gripping interengagement with the lip flange 15 by reason of being normally disposed at their gripping extremities on a slightly larger diameter than the inside diameter of the lip flange and thus effecting generally radially inward resilient deflection of the retaining finger axial legs on engagement with the inner surface of the lip flange, attained by pressing the cover axially inwardly into retaining engagement with the wheel.

In applying the cover over the outer side of the wheel, the cover is generally centered with respect to the wheel and the valve stem 12a is registered through one of the air circulation slots 21. Axially inward pressure on the cover and more particularly the rib margin 20 of the cover cams the retaining finger terminal flanges or legs 27 over the edge of the terminal flange lip 15 and places the retaining fingers 25 under resilient tension, the inner rib wall flange 27, and the resilient louver spokes 22 coacting with the retaining fingers to afford substantial resilient tensioning thrust for the retaining terminals 27.

Customarily, factory installing and service personnel utilize rubber mallets to assist in driving the cover home into retained position on the wheel. Hammering blows by the mallet are applied to the cover margin generally in line with the retaining fingers. Application of mallet blows for this purpose is facilitated by the particular construction of the marginal rib 20 which because of its generally U-shape cross-section is of substantial stiffness in an axial direction to resist efficiently deformation when struck by a rubber mallet. By virtue of the substantial axially outward offsetting of the crown or crest of the ridge afforded by the marginal rib 20 relative to the adjacent radially outer portions of the spoke louvers 22, danger of deformation of the spoke louvers by mallet blows is avoided. By the substantially straight line extension of the retaining fingers 25 from the inner side flange 23 of the marginal rib substantially straight line force of the mallet blows efficiently drives the retaining fingers axially inwardly with minimum driving force, with bottoming of the retaining finger shoulders 28 against the terminal flange portion 14 being readily detectable as a resistance to driving force applied to the marginal rib 20. Danger of overdriving and bending of the retaining fingers 25 is thus avoided.

As a further precaution against overdriving of the retaining fingers during application of the cover to the wheel, the radially outer wall flange 24 of the marginal rib 20 is preferably extended axially inwardly to fit in slightly spaced telescopic relation about the outer side of the rim terminal flange lip 15 and engage against the adjacent portion of the sidewall of the tire 17. For bearing purposes and in order to afford a rounded finished edge and to increase the rigidity of the flange 24, its axially inner extremity is preferably provided with a terminal bead 29 turned radially outwardly upon itself. Due to its roundness, the bead 29 avoids cutting or chafing the tire sidewall, and the bead presents a substantial bearing surface to the tire sidewall during malleting of the cover margin in driving the cover home onto the wheel. Furthermore, should the tire become soft or go flat, damage to the tire sidewall will be avoided by the roundness of the bead and the tire sidewall can lap over the bead without tending to push the cover from the wheel.

An important advantage of having the inner extremity portion of the wheel marginal flange 24 in telescoped adjacent relation about the terminal flange portion 15 resides in its stabilizing effect on the cover, in that transverse forces on the cover will be resisted by transverse shifting of the inner marginal beaded portion of the flange 24 against the tire rim lip 15. This will also avoid stressing of the retaining fingers 25 by otherwise possibly damaging transverse forces.

A further advantage of the bead 29 resides in that it serves as a convenient pry-off shoulder for removing the cover from the wheel. For this purpose, a pry-off tool can be inserted behind the bead 29 and leverage applied against the sidewall of the tire for drawing the retaining fingers 25 and more particularly the terminals 27 thereof free from the terminal flange lip 15.

It will be observed that the central portion 18 of the cover is supported in spaced relation to the wheel body and is thus adapted to flexibly yield by resilient flexing of the louver spokes 22 in response to curbing or other axially inward pressures thereagainst. Any such pressures, being dissipated by the resilient flexibility of the louver spokes 22, will therefore have no adverse effect upon the cover retaining fingers 25, which are further guarded by the protective buffer structure provided by the cover marginal flange 24 and the bead 29 thereof which engageably oppose the outer side of the terminal flange lip 15.

It will be understood that modifications and variations may be effected without departing from the scope of the novel concepts of the present invention.

I claim as my invention:

1. In a wheel structure including a tire rim having a terminal flange having a generally axially outwardly extending lip portion affording radially inner and radially outer annular faces, a cover member for disposition over the outer side of the wheel including a circular radially outer marginal axially outwardly projecting and axially inwardly opening rib formation dimensioned to overlie the terminal flange lip portion in concealing relation and having a radially outer generally axially inwardly extending flange portion for telescopically encompassing and closely opposing in face-to-face relation the radially outer face of said rim flange lip portion, the cover member having a radially inner portion connected to a radially inner side of said marginal rib by a plurality of louver spokes for effecting circulation of air through the cover and through openings in the wheel, and cover retaining resilient fingers carried by the radially inner side of said marginal rib and engageable in press-on, pry-off relation with the radially inner face of the terminal flange lip.

2. In a cover for disposition over the outer side of a vehicle wheel that has a terminal lip flange portion, a circular cover member having an outer marginal generally axially outwardly projecting annular rib formation of a diameter to overlie the lip flange portion, said rib formation including an axially outwardly facing crown portion and radially inner and outer confronting wall portions extending generally axially inwardly and connected in angular reinforcing relation with the crown portion for thereby affording substantial rigidity in the rib formation, the radially inner wall portion being connected to the cover member and having cover retaining means retainingly engageable with the tire rim lip flange portion, the radially outer wall portion being encompassingly disposable about the tire rim lip flange portion and having an enlarged annular terminal structure engageable by a tire side wall of a tire carried by the rim of the wheel upon which the cover member may be disposed.

3. In a wheel structure including a tire rim having a generally radially extending and axially outwardly facing terminal flange portion, said flange portion having a generally axially outwardly extending lip flange, a cover member for disposition over the outer side of the wheel including a generally U-shaped annular portion having a crown portion from which extend radially inner and outer generally axially inwardly extending spaced flange walls, the radially inner flange wall having retaining finger extensions having terminals normally projecting to a slightly larger diameter than the inside diameter of said lip flange and engageable retainingly grippingly with the radially inner side of the lip flange under resilient tension resulting from radially inward resilient flexure of the extensions to accommodate said terminals to said radially inner side of the lip flange, said U-shaped portion providing a rib to receive blows of a driving tool against the crown thereof in forcing said retaining finger terminals into engagement with said radially inner side of the lip flange, and said radially outer flange wall having an axially inner portion dimensioned to encompass the radially outer side of said terminal flange lip in closely telescoping relation and shiftable thereagainst for stabilizing the cover member against transverse forces which might tend to overstress the retaining fingers, said radially outer flange wall having an axially inner terminal projecting toward and contiguous the side wall of a tire supported on said tire rim.

4. In a wheel structure including a tire rim having a generally radially extending and axially outwardly facing terminal flange portion, said flange portion having a generally axially outwardly extending lip flange, a cover member for disposition over the outer side of the wheel including a generally U-shaped annular portion having a crown portion from which extend radially inner and outer generally axially inwardly extending spaced flange walls, the radially inner flange wall having retaining finger extensions having terminals normally projecting to a slightly larger diameter than the inside diameter of said lip flange and engageable retainingly grippingly with the radially inner side of the lip flange under resilient tension resulting from radially inward resilient flexure of the extensions to accommodate said terminals to said radially inner side of the lip flange, said U-shaped portion providing a rib to receive blows of a driving tool against the crown thereof in forcing said retaining finger terminals into engagement with said radially inner side of the lip flange, and said radially outer flange wall having an axially inner portion dimensioned to encompass the radially outer side of said terminal flange lip in closely telescoping relation and shiftable thereagainst for stabilizing the cover member against transverse forces which might tend to overstress the retaining fingers, said radially outer flange wall having an axially inner terminal projecting toward and contiguous the side wall of a tire supported on said tire rim, the cover member having a circumferentially spaced series of generally radially extending louver spoke members attached to the axially inner terminus of the axially inwardly extending radially inner flange wall of said U-shaped portion and protected from being struck by the driving tool by the axially outward projection beyond the spoke members of said U-shaped portion.

5. In a wheel structure including a tire rim having a generally radially extending and axially outwardly facing terminal flange portion, said flange portion having a generally axially outwardly extending lip flange, a cover member for disposition over the outer side of the wheel including an outer marginal generally U-shaped annular portion having radially inner and outer axially inwardly extending spaced flange walls, the radially inner flange wall having retaining finger extensions engageable retainingly with the radially inner side of the lip flange, and said radially outer flange wall having an axially inner portion dimensioned to encompass the radially outer side of said lip flange and shiftable thereagainst for stabilizing the cover member against transverse forces which might tend to overstress the retaining fingers, said radially outer flange wall having a rounded beaded terminal engageable with the opposing portion of the side wall of a tire carried by the tire rim and affording a substantial bearing surface to the tire side wall limiting axially inward driving of the annular portion in applying the cover to the wheel.

References Cited in the file of this patent

UNITED STATES PATENTS

| | | |
|---|---|---|
| 2,312,159 | Gulotta | Feb. 23, 1943 |
| 2,421,755 | Lyon | June 10, 1947 |
| 2,421,756 | Lyon | June 10, 1947 |
| 2,433,854 | Lyon | Jan. 6, 1948 |
| 2,639,948 | Grimshaw | May 26, 1953 |
| 2,749,185 | Wood | June 5, 1956 |
| 2,757,980 | Lyon | Aug. 7, 1956 |
| 2,828,838 | Lyon | Apr. 1, 1958 |
| 2,857,209 | Lyon | Oct. 21, 1958 |
| 2,857,210 | Lyon | Oct. 21, 1958 |
| 2,899,240 | Mulhern | Aug. 11, 1959 |